United States Patent
Patwardhan et al.

(10) Patent No.: US 10,686,552 B2
(45) Date of Patent: Jun. 16, 2020

(54) WIRELESS TRANSMISSION RATE ADAPTATION

(71) Applicant: Hewlett Packard Enterprise Development LP, Houston, TX (US)

(72) Inventors: Gaurav Patwardhan, Santa Clara, CA (US); Sachin Ganu, Santa Clara, CA (US); Jose Tellado, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/001,428

(22) Filed: Jun. 6, 2018

(65) Prior Publication Data
US 2019/0379482 A1 Dec. 12, 2019

(51) Int. Cl.
*H04L 1/00* (2006.01)
*H04L 27/26* (2006.01)
*H04B 7/06* (2006.01)

(52) U.S. Cl.
CPC .......... *H04L 1/002* (2013.01); *H04B 7/0697* (2013.01); *H04L 1/0005* (2013.01); *H04L 1/0011* (2013.01); *H04L 1/0035* (2013.01); *H04L 27/2646* (2013.01)

(58) Field of Classification Search
USPC ....... 370/235, 229, 252, 253, 234, 233, 232, 370/231
See application file for complete search history.

(56) References Cited

U.S. PATENT DOCUMENTS

| 7,864,678 | B1 * | 1/2011 | Sampath | H04W 28/22 370/232 |
| 8,135,032 | B2 * | 3/2012 | Tu | H04L 1/0002 370/252 |
| 8,787,405 | B1 * | 7/2014 | Bagchi | H04L 49/90 370/349 |
| 8,904,027 | B2 | 12/2014 | Knittle | |
| 9,148,816 | B2 | 9/2015 | Du et al. | |
| 2011/0305209 | A1 * | 12/2011 | Merlin | H04L 1/0001 370/329 |
| 2015/0270925 | A1 | 9/2015 | Lin et al. | |

(Continued)

OTHER PUBLICATIONS

Krishnan, A. et al., Throughput Analysis of IEEE 802.11 Multirate WLANS with Collision Aware Rate Adaptation Algorithm, (Research Paper), International Journal of Automation and Computing, Nov. 2010, pp. 571-577, vol. 7, No. 4, 2 Pgs.

(Continued)

*Primary Examiner* — Brenda H Pham
(74) *Attorney, Agent, or Firm* — Hewlett Packard Enterprise Patent Department

(57) ABSTRACT

An example method for altering a transmission rate of a networking device. The example method comprises transmitting a first set of packets using first transmission characteristics represented by a first state of a finite state machine. The example method further comprises receiving information including a success status of transmission of the first set of packets. The example method also comprises updating, based on the received information, a weight of a first edge of the finite state machine, the first edge corresponding to a transition from a state representing prior transmission characteristics to the first state.

17 Claims, 7 Drawing Sheets

(56) References Cited

U.S. PATENT DOCUMENTS

2016/0057647 A1    2/2016  Sullivan et al.
2019/0140784 A1*   5/2019  Xi ........................ H04L 1/0063

OTHER PUBLICATIONS

Singh, A. et al., A Semi Markov-based Analysis of Rate Adaptation Algorithms in Wireless LANS, (Research Paper), 10 Pgs.

* cited by examiner

WIRELESS TRANSMISSION RATE ADAPTATION

BACKGROUND

Wireless networks do not have a perfect success rate for transmitting packets. Sometimes, due to environmental, device, or network characteristics, packets sent from a wireless access point of a wireless network are not properly received at the destination device. Certain characteristics of packet transmission from the wireless access point can be adjusted to reduce the packet transmission error rate or to improve the data throughput across the wireless connection. A wireless access point may adjust characteristics of its packet transmissions to achieve a preferred balance between transmission errors and data throughput.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
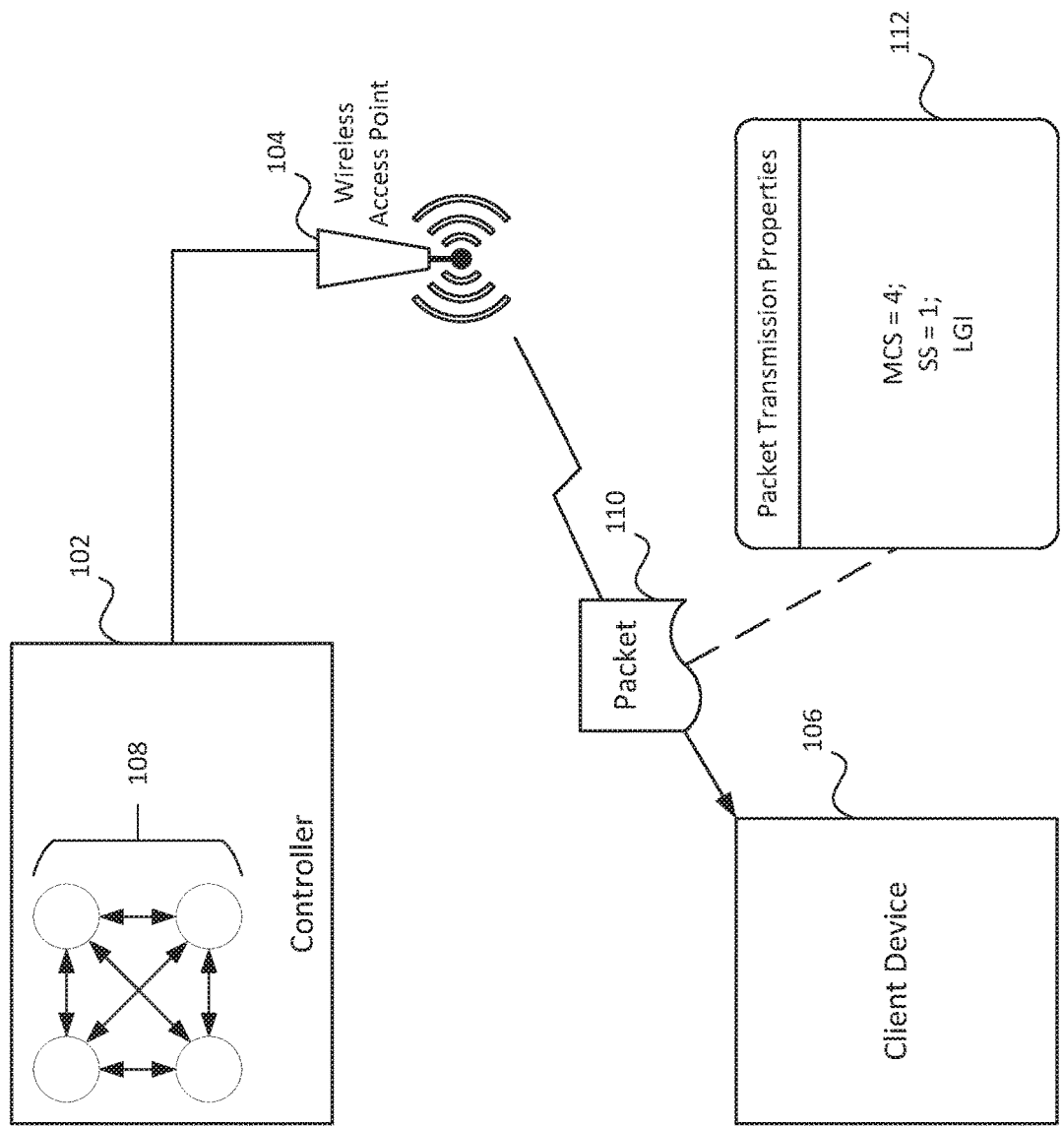
FIG. 1 illustrates an example wireless network.

Certain examples have features that are in addition to or in lieu of the features illustrated in the above-referenced figures. Certain labels may be omitted from certain figures for the sake of clarity.

DETAILED DESCRIPTION

An example wireless access point (AP) uses a certain modulation and coding scheme (MCS), a number of spatial streams (SS), and a certain guard interval (GI) to transmit packets to a connected device. The context surrounding the AP (e.g. type and number of connected devices, environmental characteristics, interference from RF sources, etc.) influences the success rate of packet transmission using the certain MCS, SS, and GI. Generally, there is a tradeoff between data throughput and packet transmission success rate for a given AP context. For example, in ideal conditions, the AP may be capable of transmitting using the MCS, SS, and GI configurations that allow for the highest data throughput without a significant negative impact on the success rate of packet transmission. However, in less-than-ideal conditions, the AP may transmit using MCS, SS, and GI configurations that reduce the data throughput, but improve the success rate of packet transmission in comparison to configurations that would (without taking context into account) increase data throughput.

In an example, the wireless AP transmits packets to a connected device using first transmission characteristics (e.g. a certain MCS, a certain number of SS, a certain GI). The connected device periodically sends received packet information to the AP, from which the AP determines the success or failure of each packet transmission. The AP accesses a finite state machine (FSM) (which may reside on the AP or on a controller connected to the AP through the network) and updates the weights of certain edges of the FSM based on the received packet information.

The FSM includes states and edges. Each state may represent a certain set of transmission characteristics, and each edge may represent a transition between a pair of states. In some examples, pairs of states may have multiple edges transitioning between them (e.g. a success probability edge, a failure probability edge, edges for each of a set of signal-to-noise ratio (SNR) ranges or received signal strength indication (RSSI) ranges, etc.). The FSM may have multiple dimensions, with each dimension corresponding to a different transmission characteristic or contextual characteristic (e.g. MCS, SS, GI, SNR, packet size, quality of experience, etc.). In certain examples, the FSM is a Markov chain. In such examples, the sum of all success probability edges is 1 and the sum of all failure probability edges is 1. The AP may transition from one state to another across an edge when it is profitable to do so. In some examples, it is profitable to transition when the relevant success probability edge is above a certain threshold and the relevant failure probability edge is below another certain threshold (For example, the success probability is above 0.65 and the failure probability is below 0.35).

In some examples, a counter is incremented for each packet transmitted by the AP, and once the counter exceeds a threshold, the AP transitions from the then-current state of the FSM to the next state, as determined to be most profitable. The AP then transmits packets using the transmission characteristics of the next state. Each state includes one or more self-referring edges (the head of the edge and the tail of the edge point to the same state), and the transition may not result in the AP going to a different set of transmission characteristics if the transition returns to the same state. In certain examples, the look-around rate (the frequency of transitions) is initialized to a certain value (e.g. 10%) and adjusts during the operation of the rate adaptation algorithm. In certain other examples, the look-around rate is initialized to a certain value and continues at the certain value during operation of the rate adaptation algorithm.

In some other examples, the AP transitions after every packet transmitted by the AP. In yet other examples, the AP transitions when certain contextual characteristics (e.g. SNR, Packet Error Rate) substantially change. This disclosure contemplates the AP transitioning between states of the FSM based upon any triggering event that would be appropriate for transmission rate adaptation purposes.

In some examples, when information is received at the AP from a client device containing success or failure information about previously transmitted packets, the AP alters weights of certain edges of the FSM based on the success or failure information. In some examples, the AP alters the weights based on success or failure information for one or more packets transmitted immediately before a state transition and for one or more packets transmitted immediately after a state transition. In some other examples, the AP alters the weight based on success or failure information for all packets.

As an example, if the AP transmits a packet using first transmission characteristics, transitions to a state representing second transmission characteristics, and then transmits a packet using second transmission characteristics, the AP may then receive information that causes the AP to determine that both packets were successfully transmitted. Once the AP determines that both packets were successfully transmitted, the AP may adjust the weight of a success probability edge from a state representing the first transmission characteristics to the state representing the second transmission characteristics. The AP may then adjust weights of other success probability edges from the state representing the first transmission characteristics so that the sum of weights for all success probability edges transitioning from the state representing the first transmission characteristics is equal to one.

Likewise, the AP may adjust the weight of a failure probability edge from the state representing the first transmission characteristics to the state representing the second transmission characteristics. The AP may then adjust weights of other failure probability edges from the state representing the first transmission characteristics so that the sum of weights for all failure probability edges transitioning from the state representing the first transmission characteristics is equal to one.

Over time, as the AP receives additional information, the accuracy of the FSM improves such that for a given context, the AP efficiently transitions to a set of transmission characteristics that achieve a desirable balance of low packet error rate and high data throughput. In some examples, the FSM is initialized using a pre-existing rate adaptation algorithm (e.g. Minstrel), and over time, the performance of the AP improves to be better than the initializing algorithm.

FIG. 1 illustrates an example wireless network. Wireless network 100 includes controller 102, wireless access point (AP) 104, and client device 106. Controller 102 includes finite state machine (FSM) 108. AP 104 transmits packet 110 to client device 106. Packet 110 has packet transmission properties 112. In some examples, controller 102 is a separate device coupled to AP 104 via a network link. In some other examples, controller 102 is a subsystem of AP 104. Throughout this disclosure, controllers are described separately from APs. Similarly to FIG. 1, such controllers described in this disclosure may be separate devices coupled to their respective APs, or such controllers may be subsystems of their respective APs.

During network operation, AP 104 wirelessly transmits and receives data packets with client devices. One common protocol for wireless transception of data to and from an AP 104 is IEEE 802.11 (Wi-Fi). Although this disclosure discusses wireless transception in the context of Wi-Fi, any appropriate wireless protocol is contemplated. When transmitting a data packet 110 to a client device 106, AP 104 has the ability to configure the characteristics of the data transmission in multiple ways. Some example configurable characteristics include modulation and coding scheme (MCS), number of spatial streams (SS), and guard interval (GI). In this disclosure, long guard interval will be abbreviated "LGI" and short guard interval will be abbreviated "SGI". Each packet 110 has a set of transmission properties 112, which include the specific AP 104 configured transmission characteristics at the time of transmission of packet 110 (e.g. MCS=4; SS=1; LGI).

In some examples, client device 106 sends information to AP 104 from which AP 104 determines a success or failure status of packet 110. One such example of information sent from client device 106 is a TCP ACK. This disclosure contemplates any appropriate information received at AP 104 from which AP 104 can determine whether packet 110 was successfully received at client device 106.

Upon determining the success or failure of the transmission of packet 110, AP 104 may update FSM 108. In some examples, information about packets from prior to a FSM 108 state transition and packets from after the FSM 108 state transition may be used to determine the success or failure of the FSM 108 state transition. In such examples, a weight of an edge of FSM 108 representing the success probability of the FSM 108 state transition may be altered to reflect the success or failure of the FSM 108 state transition. In certain examples, a weight of an edge of FSM 108 representing the failure probability of the FSM 108 state transition may also be altered. In certain examples, additional edges originating at the initial state of the FSM 108 state transition may be altered so that the sum of the weights of success probabilities originating at the initial state is equal to one and the sum of the weights of failure probabilities originating at the initial state is also equal to one.

In some examples, the weights of each edge originating from a certain state account for the profitability of each state change. For example, if transitioning a first edge ideally results in a 25% gain in data throughput and if transitioning a second edge ideally results in a 40% gain in data throughput, the weight of the first edge may be altered less for a successful state change than the weight of the second edge may be altered for a similar success. In such examples, the rate adaptation algorithm is biased toward the more profitable state change, all else being equal.

Figure 2:
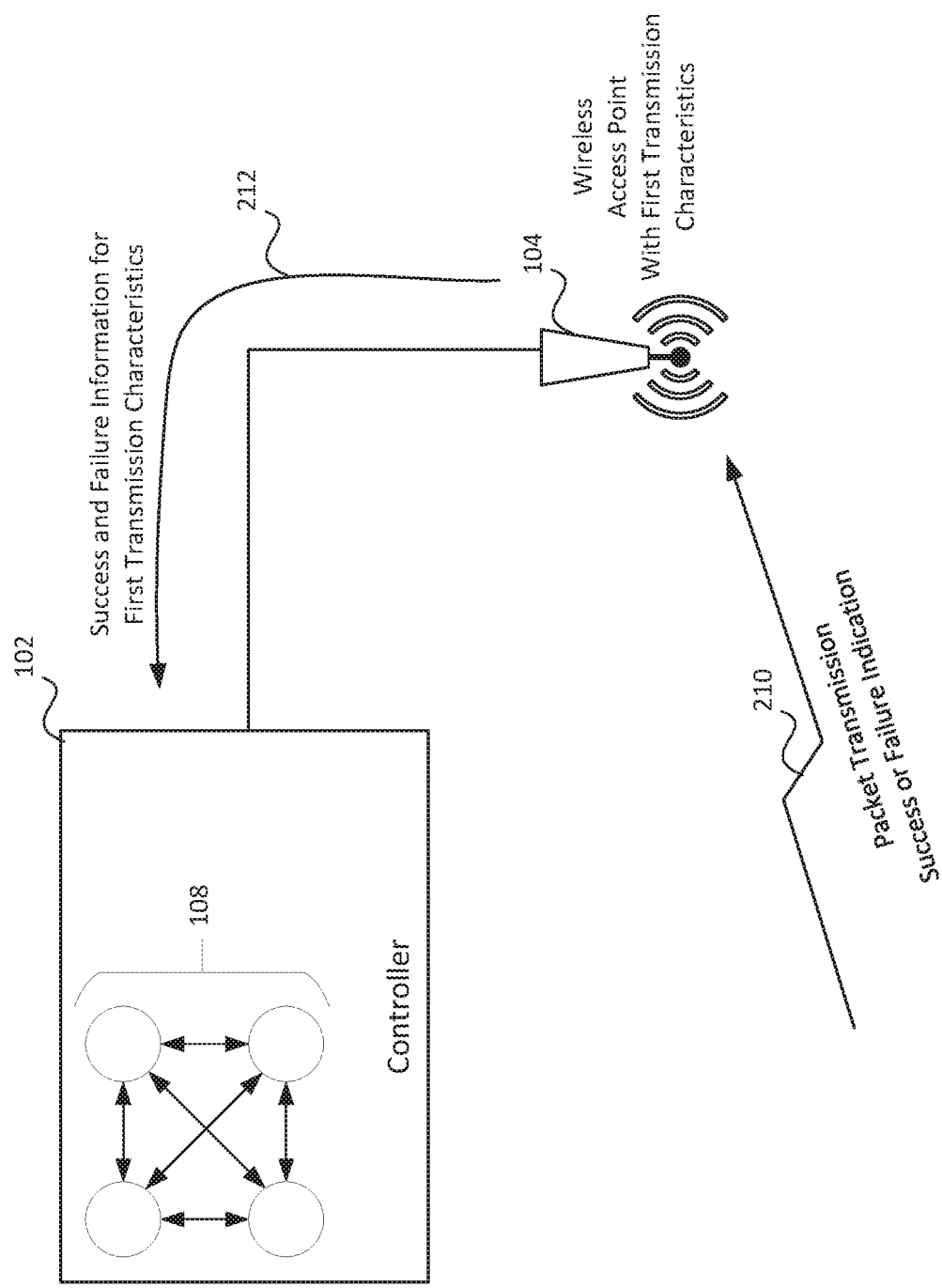
FIG. 2 illustrates another example wireless network receiving a packet transmission success or failure indication.

FIG. 2 illustrates another example wireless network receiving a packet transmission success or failure indication. Wireless network 200 includes controller 102 and AP 104. Controller 102 includes FSM 108. AP 104 receives packet transmission success or failure indication (SoF indication) 210 from a client device (not shown). Controller 102 receives success and failure information (SaF information) 212 for first transmission characteristics from AP 104.

In some examples, Each SoF indication 210 received is processed by AP 104 and corresponding SaF information 212 is sent to controller 102. In some other examples, AP 104 receives multiple SoF indications 210 and determines success or failure of a state transition. AP 104 then sends SaF information 212 to controller 102 based on the multiple SoF indications 210. In some examples, certain SoF indications 210 received by AP 104 are processed to determine success or failure of a state transition and other certain SoF indications are not processed to determine success or failure of the state transition. For example, SoF indications received during a certain time period after a state transition may be processed to determine the success or failure of the state transition. As shown in the example of FIG. 2, SoF indication 210 is processed by AP 104 to generate SOF information 212 for the state transition to first transmission characteristics. In certain examples, SoF indication 210 is an indication relating to a first packet sent using first transmission characteristics after a state transition. If SoF indication 210 indicates the successful reception of the first packet, SaF information 212 may cause controller 102 to adjust a weight of an edge between the prior state and the state representing the first transmission characteristics to reflect the successful transmission of the first packet. If SoF indication 210 indicates the failed reception of the first packet, SaF information 212 may cause controller 102 to adjust a weight of an edge between the prior state and the state representing the first transmission characteristics to reflect the failed transmission of the first packet.

In certain examples, the edge between the prior state and the state representing the first transmission characteristics is alone in directly coupling the prior state to the state representing the first transmission characteristics. In certain other examples, the edge between the prior state and the state representing the first transmission characteristics is one of multiple edges connecting the prior state to the state representing the first transmission characteristics. For example, the edge may represent the transition between the states for a certain SNR value, and other edges coupling the states may represent the transition between the states for other SNR values. Although, in certain examples, a certain parameter may be represented as an additional dimension of the FSM or through multiple edges between a pair of states, it would be clear to a person having ordinary skill in the art that both such representations are logically interchangeable.

Figure 3:
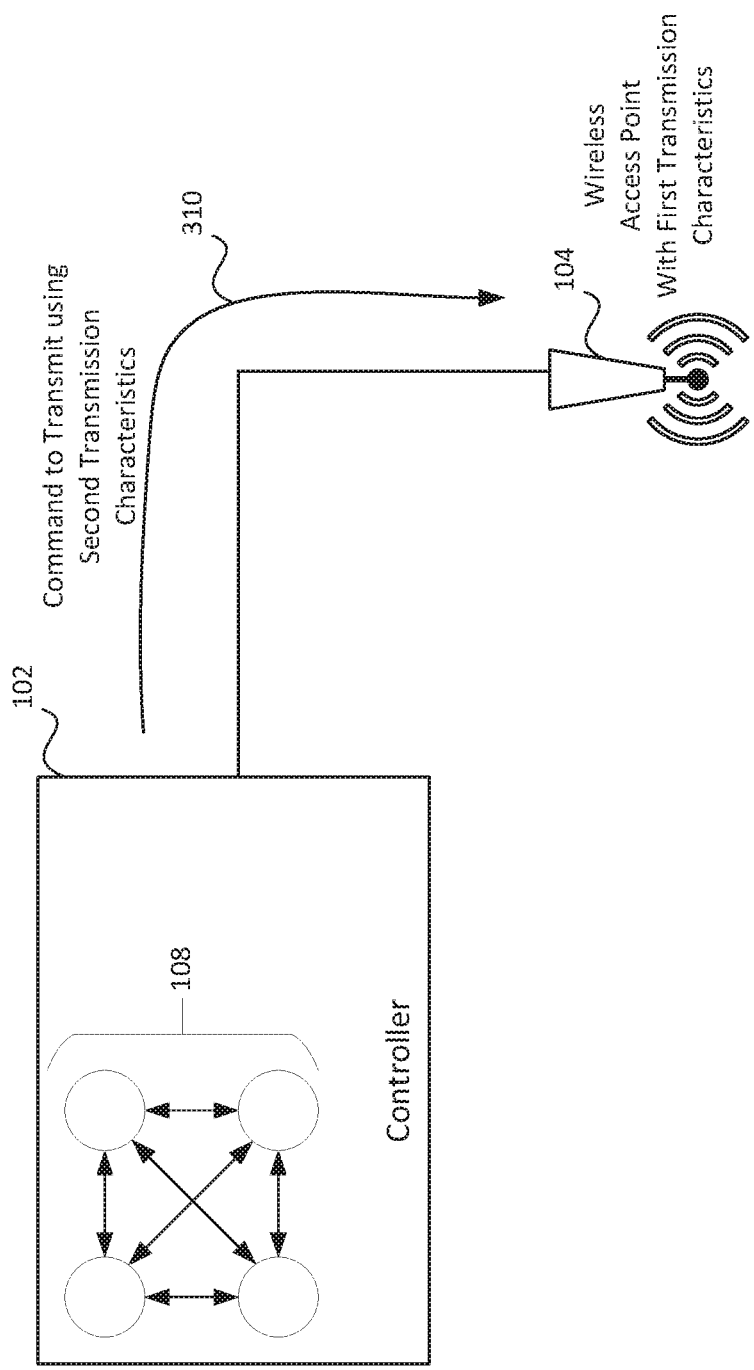
FIG. 3 illustrates another example wireless network.

FIG. 3 illustrates another example wireless network. Wireless network 300 includes controller 102 and AP 104. Controller 102 includes FSM 108. Controller 102 sends command 310 to transmit using second transmission characteristics to AP 104. In some examples, a look-around rate (i.e. the frequency with which the current state of FSM 108 is transitioned, resulting in AP 104 transmitting using the transmission characteristics of the new current state) is initialized to a certain value. For example, if FSM 108 is initialized using the Minstrel rate adaptation algorithm, the initial look-around rate may be set to 10%. In some examples, a 10% look-around rate is achieved by incrementing a counter for each packet transmitted by AP 104. Once ten packets are sent, FSM 108 transitions to the next state. Although a counter/threshold method for implementing a look-around rate is described in detail, this disclosure contemplates any appropriate method for triggering periodic FSM 108 state transitions, including timer-based event triggers, environmental context-based event triggers, manual event triggers, etc.

In some examples, controller 102 determines, based on FSM 108, a set of transmission characteristics for AP 104 to transmit packets. For example, command 310 configures AP 104 to transmit all further packets using second transmission characteristics. Command 310 may be sent from controller 102 in response to a current state of FSM 108 transitioning from a certain state representing the current transmission characteristics of AP 104 to a different state representing different transmission characteristics. The different transmission characteristics may have a larger or a smaller ideal data throughput than the current transmission characteristics.

Figure 4:
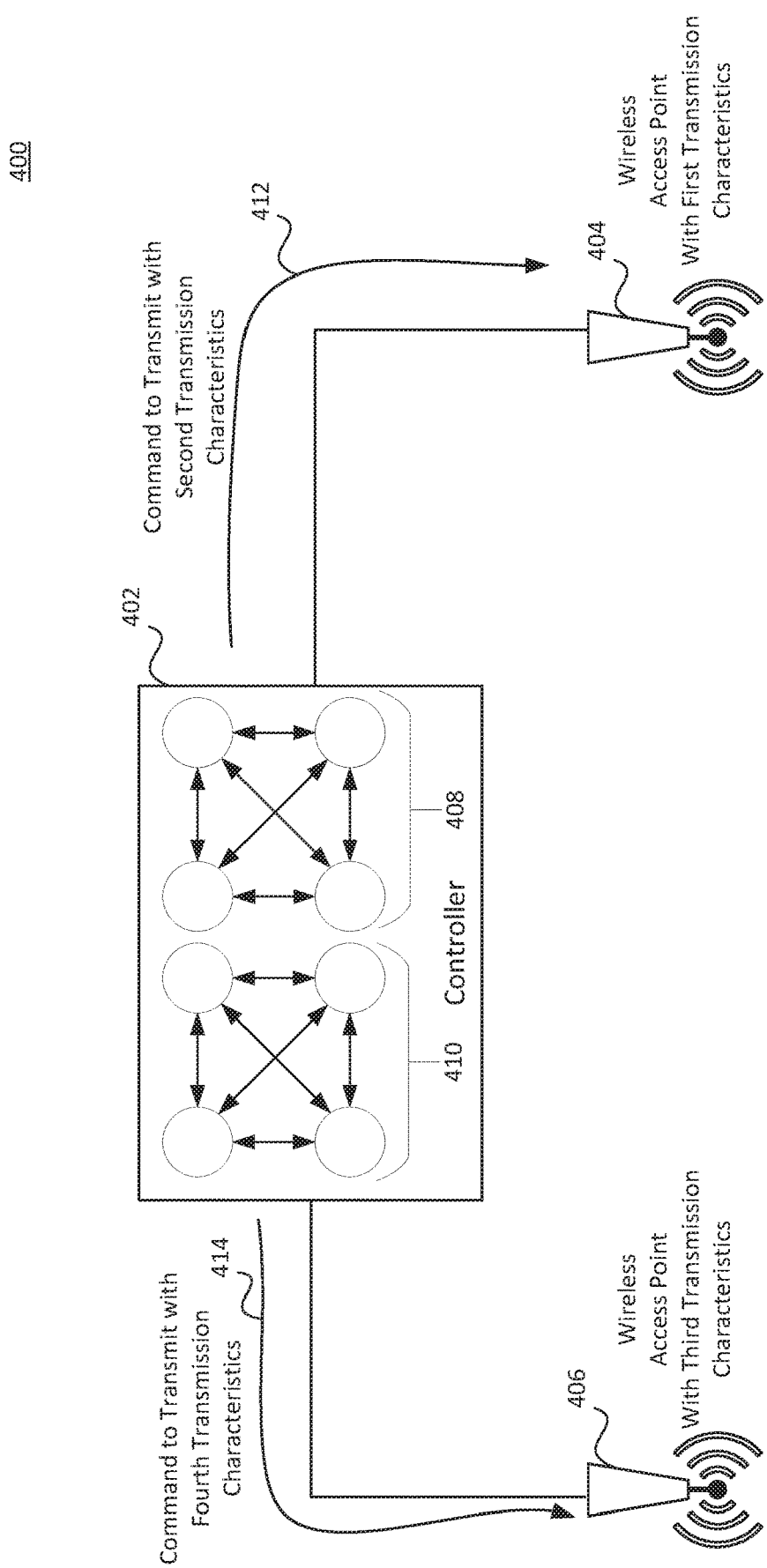
FIG. 4 illustrates another example wireless network with two wireless access points.

FIG. 4 illustrates another example wireless network with two wireless access points. Wireless network 400 includes controller 402, first AP 404, and second AP 406. Controller 402 includes first FSM 408 and second FSM 410. Controller 402 sends first command 412 and second command 414 to first AP 404 and second AP 406, respectively. In some examples where controller 402 is a separate device from APs 404 and 406, controller 402 includes an FSM 408 and 410 for each coupled AP 404 and 406. In some other examples, all APs 404 and 406 coupled to controller 402 use a single FSM, and each AP 404 and 406 may include its own status indicators within the single FSM.

In some examples, controller 402 independently manages each AP 404 and 406. For example, controller 402 sends command 412 to AP 404 to configure AP 404 to transmit with second transmission characteristics, and controller 402 sends command 414 to AP 406 to configure AP 406 to transmit with fourth transmission characteristics.

Figure 5:
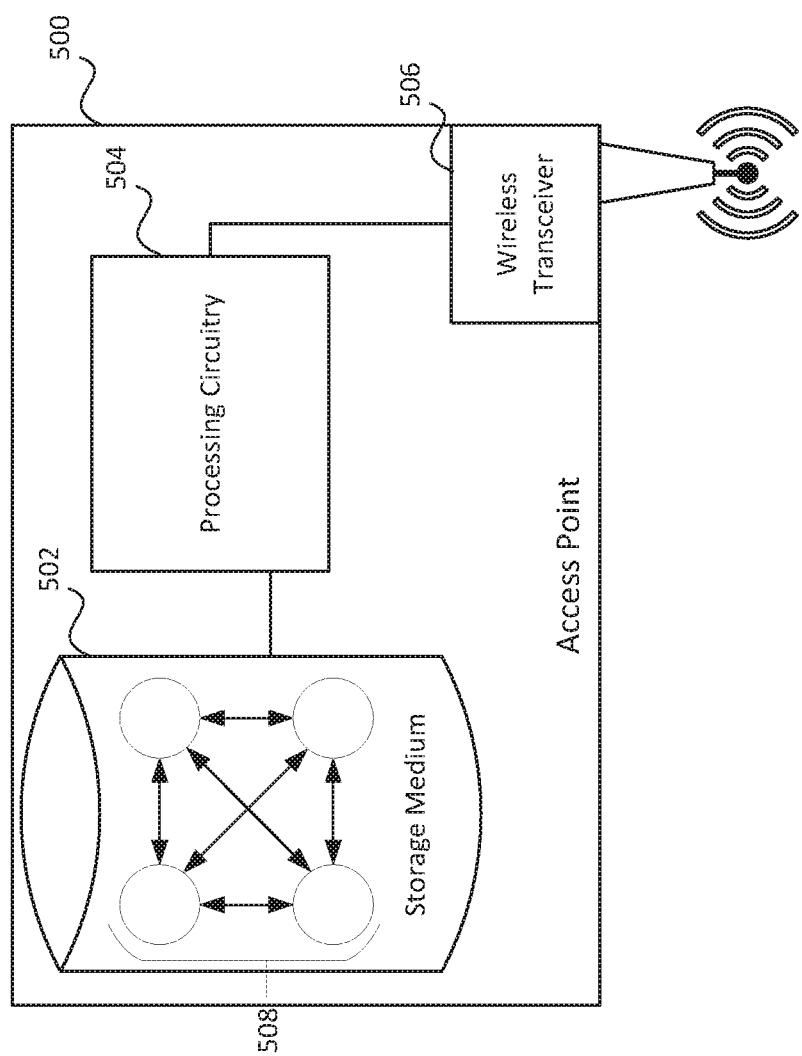
FIG. 5 illustrates an example wireless access point.

FIG. 5 illustrates an example wireless access point. AP 500 includes storage medium 502, processing circuitry 504 and wireless transceiver 506. Storage medium 502 includes FSM 508. Storage medium 502 includes instructions that are executed by processing circuitry 504 to cause processing circuitry 504 to undertake certain actions. Certain instructions cause processing circuitry 504 to transmit a first set of packets via wireless transceiver 506 using first transmission characteristics. The first transmission characteristics are represented by a first state of FSM 508. Certain other instructions cause processing circuitry 504 to receive information via wireless transceiver 506 including a transmission success status for each packet of the first set of packets. Certain other instructions cause processing circuitry 504 to update weight of a first set of edges of FSM 508 based on the received information. The first set of edges corresponds to success and failure probabilities of packets transmitted using the first transmission characteristics. Certain other instructions cause processing circuitry 504 to transition FSM 508 from the first state to a second state corresponding to second transmission characteristics.

The following describes an example implementation of AP 500. AP 500 begins transmitting packets using the first transmission characteristics. Client devices begin sending data to AP 500 that includes information such as transmission success status for packets sent from AP 500 to the respective client device. AP 500 then determines success and failure information for the transition from previous transmission characteristics to the first transmission characteristics based on the received information from the client devices. AP 500 updates the weight of the edge between the previous transmission characteristics and the first transmission characteristics to reflect the success and failure information previously determined. AP 500 may then also update the weights of other edges originating at the state representing the previous transmission characteristics such that all edges of a type (e.g. success probability, failure probability, etc.) equal a pre-determined sum value. For example, in a Markov chain implementation, each weight of each outgoing success probability edge represents, in part, the probability of successful transmission of packets by transitioning the respective edge. The sum of all outgoing success probability edges would thus equal 1.

Each weight of each edge may further incorporate additional factors, such as profitability of transiting the edge. In some examples, additional incorporated factors alter the weight of each edge. In some other examples, the additional incorporate factors instead alter the "inertia" of the weight of each edge. In other words, it may be more difficult to reduce the success probability of a highly profitable edge in comparison to a less profitable edge.

In some examples, additional instructions may further cause processing circuitry 504 to transmit via wireless transceiver 506 a second set of packets using the second transmission characteristics. Certain other instructions may cause processing circuitry 504 to receive information include transmission success status for packets of the second set of packets. Certain other instructions may cause processing circuitry 504 to update weights of a second set of edges of FSM 508 corresponding to success and failure probabilities of packets transmitted using the second transmission characteristics. Certain other instructions may cause processing circuitry 504 to transition FSM 508 from the second state back to the second state. In certain contexts, the most profitable move is not to transition. In such contexts, when the look-around period triggers a transition, FSM 508 follows an edge that originates from the second state and terminates at the second state.

Figure 6:
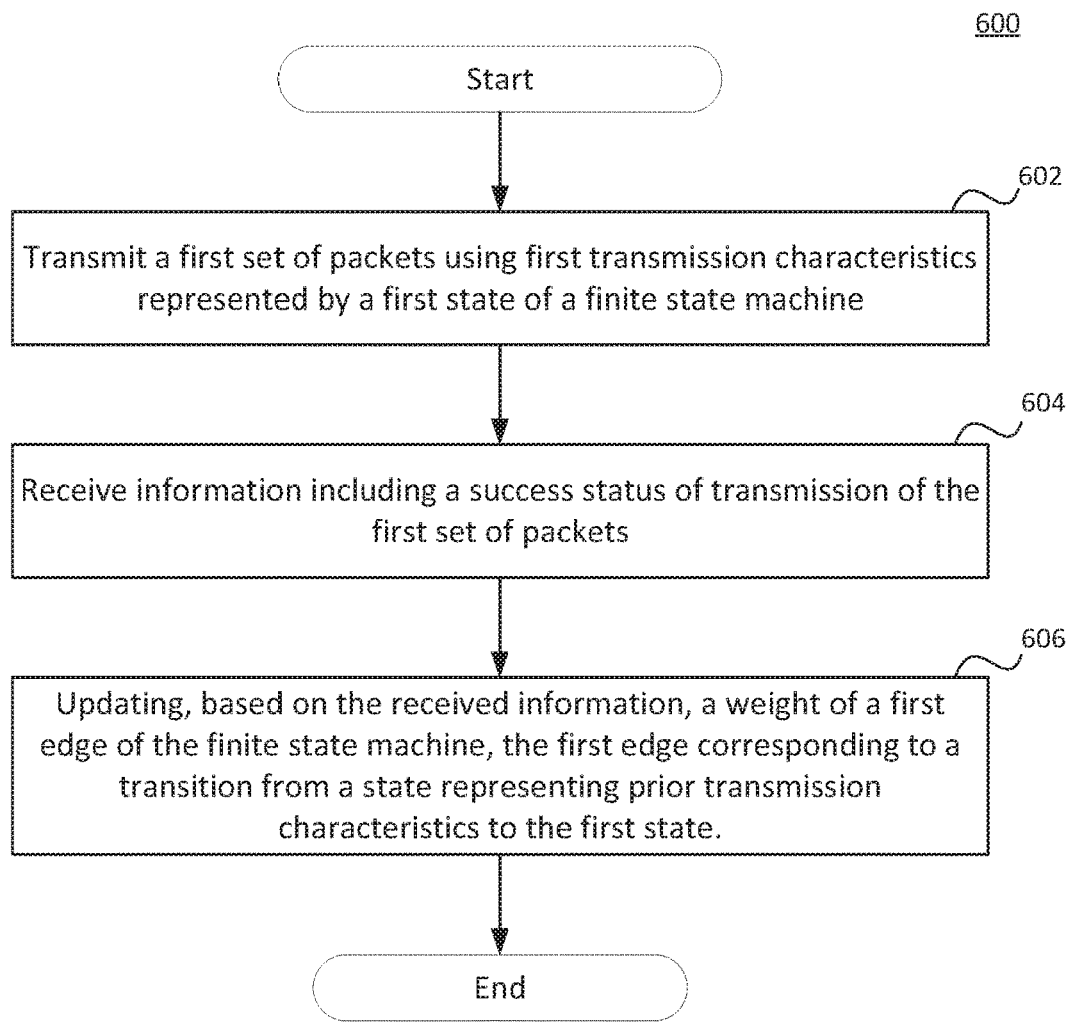
FIG. 6 is a flowchart illustrating an example method for adapting a wireless transmission rate.

FIG. 6 is a flowchart illustrating an example method for adapting a wireless transmission rate. Method 600 updates a FSM based on received information about the success status of packets transmitted using certain transmission characteristics.

Block 602 transmits a first set of packets using first transmission characteristics represented by a first state of a FSM. In some examples, the first set of packets are transmitted to client devices paired with an AP. In certain examples, the first transmission characteristics include a first MCS, a first SS, and a first GI.

Block 604 receives information including a success status of transmission of the first set of packets. For example, an AP may receive an ACK message from a client device for one of the first set of packets. This disclosure contemplates any appropriate information being received that can be used to determine whether a packet of the first set was successfully transmitted to its immediate destination.

Block 606 updates a weight of a first edge of the FSM based on the information received in block 604. The first edge corresponds to a transition from a state representing prior transmission characteristics to the first state. In some examples, weights of other edges originating at the state representing the prior transmission characteristics are updated in response to the update of the weight of the first edge.

Figure 7:
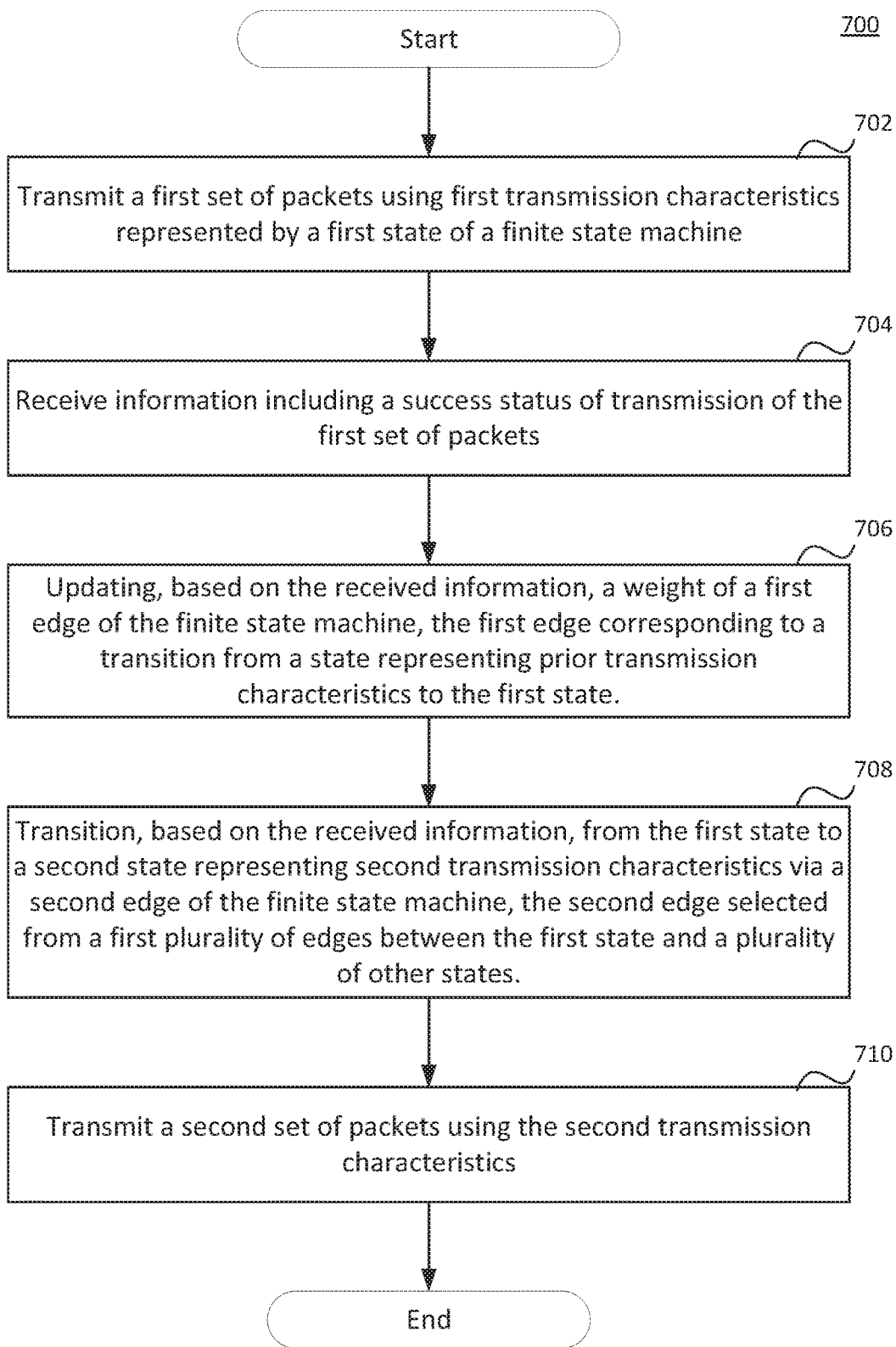
FIG. 7 is a flowchart illustrating another example method for adapting a wireless transmission rate.

FIG. 7 is a flowchart illustrating another example method for adapting a wireless transmission rate. Method 700 transitions between states of a FSM based on information received about the success status of a set of packets.

Block 702 transmits a first set of packets using first transmission characteristics represented by a first state of a FSM. In some examples, the first set of packets are transmitted to client devices paired with an AP. In certain examples, the first transmission characteristics include a first MCS, a first SS, and a first GI.

Block 704 receives information including a success status of transmission of the first set of packets. For example, an AP may receive an ACK message from a client device for one of the first set of packets. This disclosure contemplates any appropriate information being received that can be used to determine whether a packet of the first set was successfully transmitted to its immediate destination.

Block 706 updates a weight of a first edge of the FSM based on the information received in block 704. The first edge corresponds to a transition from a state representing prior transmission characteristics to the first state. In some examples, weights of other edges originating at the state representing the prior transmission characteristics are updated in response to the update of the weight of the first edge.

Block 708 transitions from the first state to a second state representing second transmission characteristics via a second edge of the FSM. The second edge is selected from a set of edges transitioning between the first state and other states. In some examples, the second edge is selected because it is the most profitable edge of the set of edges, taking into account probabilities of success and probabilities of failure.

Block 710 transmits a second set of packets using the second transmission characteristics. In some examples, a controller device (or a controller subsystem) transmits a command to a wireless transceiver of an AP that reconfigures a transmitter portion of the wireless transceiver to transmit packets using the second transmission characteristics.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A method for altering a transmission rate of a networking device, comprising:
   transmitting a first set of packets using first transmission characteristics represented by a first state of a finite state machine;
   receiving information including a success status of transmission of the first set of packets;
   updating, based on the received information, a weight of a first edge of the finite state machine, the first edge corresponding to a transition from a state representing prior transmission characteristics to the first state
   transitioning, based on the received information, from the first state to a second state representing second transmission characteristics via a second edge of the finite state machine, wherein the second edge is selected from a first plurality of edges between the first state and a plurality of other states, and wherein the first plurality of edges represent success probabilities for transitioning from the first state to a head state of each respective edge of the first plurality, and wherein a second plurality of edges represent failure probabilities for transitioning from the first state to a head state of each respective edge of the second plurality; and
   transmitting a second set of packets using the second transmission characteristics.

2. The method of claim 1, wherein the transition from the first state to the second state is selected based on the success probability of the second edge and the failure probability of a third edge from the first state to the second state.

3. The method of claim 1, wherein each weight of each edge of the first plurality and the second plurality has an initial value and each weight is updated when information is received about packets transmitted using transmission characteristics associated with a head state of each respective edge.

4. The method of claim 1, further comprising:
   incrementing a counter for each packet of the second set of packets; and
   initiating a state transition once the counter exceeds a threshold.

5. A wireless access point, comprising:
   a wireless transceiver;
   processing circuitry; and
   a storage medium including instructions that, when executed by the processing circuitry, cause the processing circuitry to:
     transmit a first set of packets using first transmission characteristics represented by a first state of a finite state machine;
     receive information including transmission success status for each packet of the first set of packets;
     update, based on the transmission success status, weights of a first plurality of edges in a finite state machine corresponding to success and failure probabilities of packets transmitted using the first transmission characteristics; and transition from the first state to a second state of the finite state machine corresponding to second transmission characteristics via a second edge of the finite state machine, wherein the second edge is selected from a first plurality of edges between the first state and a plurality of other states, and wherein the first plurality of edges represent success probabilities for transitioning from the first state to a head state of each respective edge of the first plurality, and wherein a second plurality of edges represent failure probabilities for transitioning from the first state to a head state of each respective edge of the second plurality.

6. The wireless access point of claim 5, wherein the instructions further cause the processing circuitry to:

transmit, via the wireless transceiver, a second set of packets using the second transmission characteristics;

receive information including transmission success status for each packet of the second set of packets;

update, based on the transmission success status for each packet of the second set of packets, weights of a second plurality of edges in the finite state machine corresponding to success and failure probabilities of packets transmitted using the second transmission characteristics; and transition from the second state to the second state.

7. The wireless access point of claim 6, wherein the profitability of transitioning from the second state to another state of the finite state machine is less than the profitability of transitioning back to the second state.

8. The wireless access point of claim 5, wherein the finite state machine is a Markov chain.

9. The wireless access point of claim 5, wherein transmission characteristics include a modulation and coding scheme, a number of spatial streams, and a guard interval.

10. The wireless access point of claim 9, wherein the finite state machine is a three-dimensional finite state machine, wherein a first dimension represents modulation and coding schemes, a second dimension represents numbers of spatial streams, and a third dimension represents guard intervals.

11. The wireless access point of claim 5, wherein the weights of the first plurality of edges are initialized based on an existing rate adaptation algorithm.

12. A non-transitory computer-readable medium comprising instructions that, when executed by processing circuitry, cause the processing circuitry to:

wirelessly transmit a first set of packets using a first modulation and coding scheme, a first number of spatial streams, and a first guard interval;

receive information including whether each packet of the first set was successfully transmitted;

update, based on the received information, a weight of an edge of a Markov chain representing a transition to a first state corresponding to the first modulation and coding scheme, the first number of spatial streams, and the first guard interval;

transition from the first state to a second state of the finite state machine corresponding to a second modulation and coding scheme, a second number of spatial streams, and a second guard interval, via a second edge of the finite state machine, wherein the second edge is selected from a first plurality of edges between the first state and a plurality of other states, and wherein the first plurality of edges represent success probabilities for transitioning from the first state to a head state of each respective edge of the first plurality, and wherein a second plurality of edges represent failure probabilities for transitioning from the first state to a head state of each respective edge of the second plurality; and wirelessly transmit a second set of packets using the second modulation and coding scheme, the second number of spatial streams, and the second guard interval.

13. The computer-readable medium of claim 12, further comprising instructions that cause the processing circuitry to:

receive additional information including whether each packet of the second set was successfully transmitted;

update, based on the received additional information, a weight of another edge of the Markov chain representing a transition to the second state.

14. The computer-readable medium of claim 12, wherein each edge of the Markov chain further corresponds to a certain signal-to-noise ratio.

15. The computer-readable medium of claim 13, wherein the first modulation and coding scheme is the same as the second modulation and coding scheme, and wherein the first number of spatial streams is the same as the second number of spatial streams.

16. The computer-readable medium of claim 14, wherein the Markov chain is four-dimensional, and wherein a first dimension corresponds to modulation and coding schemes, a second dimension corresponds to numbers of spatial streams, a third dimension corresponds to guard intervals, and a fourth dimension corresponds to signal-to-noise ratios.

17. The computer readable medium of claim 12, wherein the weight of the edge corresponds to a success probability of packet transmission.

\* \* \* \* \*